(No Model.)
J. L. WINSLOW.
Oil Cup.
No. 240,214. Patented April 12, 1881.
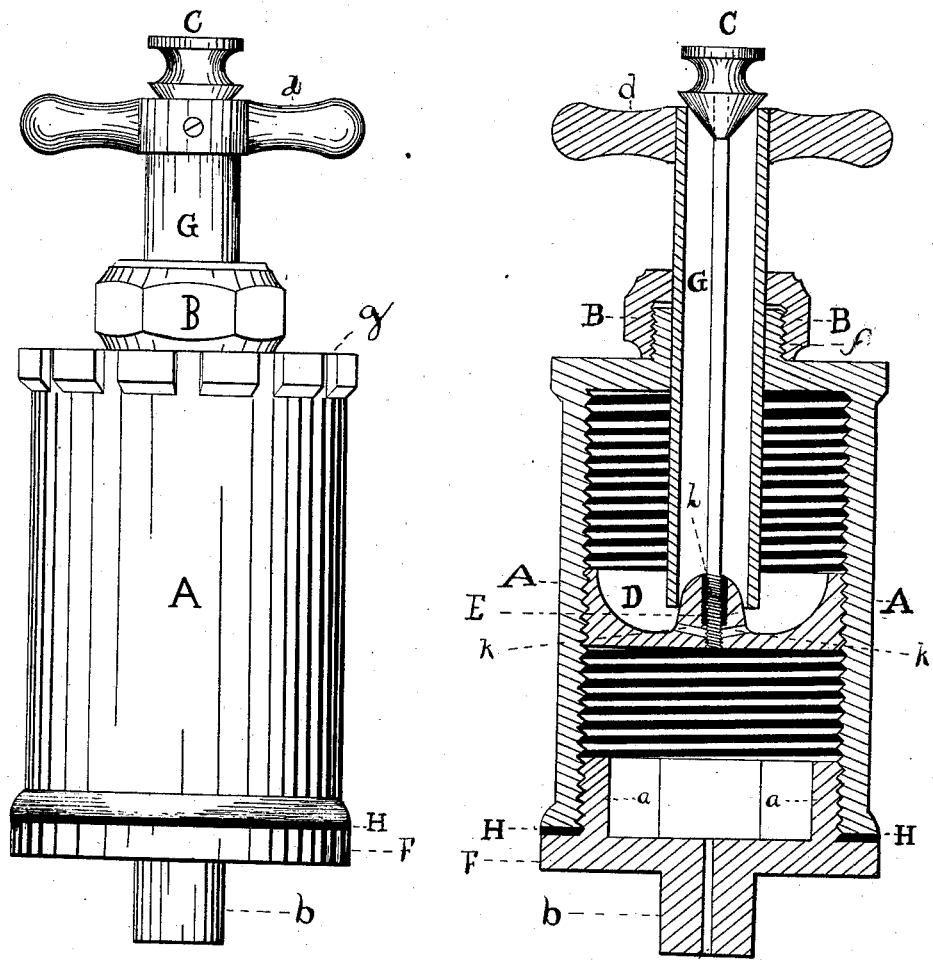
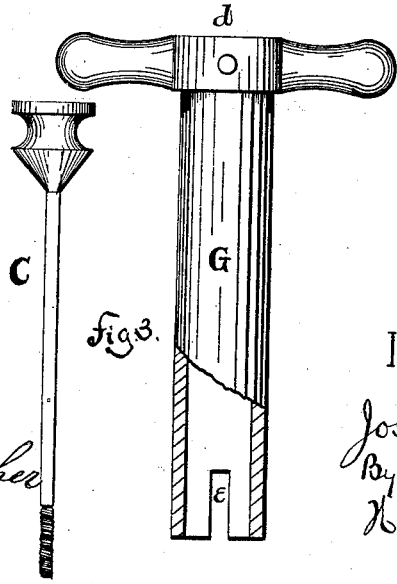
WITNESSES:
George H. Marquis
Maurice P. Fisher
INVENTOR:
Joseph L. Winslow
By his atty
Herbert J. Briggs

UNITED STATES PATENT OFFICE.

JOSEPH L. WINSLOW, OF DEERING, ASSIGNOR OF ONE-HALF TO ORRIN HAMILTON AND FREDERIC T. MEAHER, OF PORTLAND, MAINE; SAID MEAHER ASSIGNOR TO SAID HAMILTON.

OIL-CUP.

SPECIFICATION forming part of Letters Patent No. 240,214, dated April 12, 1881.

Application filed December 14, 1880. (No model.)

*To all whom it may concern:*

Be it known that I, JOSEPH L. WINSLOW, residing in Deering, in the county of Cumberland and State of Maine, have invented certain new and useful Improvements in Oil or Grease Cups; and I do hereby declare that the following is a full, clear, and exact description of the invention, which will enable others skilled in the art to which it appertains to make and use the same.

My invention has relation to an improvement in that class of mechanical contrivances commonly known as "oil or lubricating cups" for machinery.

The especial object of my said invention has relation to the production of a novel and ingenious device for holding lubricating substances, in which very hard grease or lubricant can be economically and effectively used, and which shall have contained within it suitable mechanical power for expelling the lubricant.

The invention also contemplates the production of a lubricating-cup in which any of the ordinary light lubricating oils or fluids can be used equally as well as a hard lubricant.

The invention further has for its object the production of a cup which, when attached to and subjected to the violent vibrations of a locomotive or marine engine or other classes of machinery, will prove to be of inestimable practical value for securely retaining the contained grease or lubricant, and will at the same time readily and freely feed the lubricant, by the operation of its self-contained mechanical power, to the parts to be lubricated only in such quantity as shall be necessary.

The several parts of which my invention consists and the skillful manner in which they are combined and arranged and operated will be fully comprehended by reference to the subjoined specific description of parts and the accompanying drawings, in which—

Figure 1 shows an elevation of the cup. Fig. 2 represents the cup in vertical section. Fig. 3 is a detail of hollow stem or key and screw-bolt.

Similar letters of reference denote similar parts.

A represents the main body of the cup, which is a cylinder in form. The bore or caliber of this cylinder is a female screw. Running around the top of the cylinder A is a projecting rim, in which grooves or recesses $g$ are cut. This construction of the rim is for the purpose of providing a good bearing-surface, to be griped by a spanner or wrench when screwing the cylinder on or off the base-block F, which supports the cylinder A when the cup is in use. On the top plane of F is located a short cylindrical projection, $a$, having a male screw cut upon its circumference, the male screw of $a$ engaging exactly with the female-screw caliber of A. By this means A and F can be firmly and securely screwed together. For the obvious purpose of producing a perfect union of the parts when screwed together, a washer, H, made of leather or any suitable material, is placed between the lower rim of A and the base-block F. The washer also serves as a cushion to relieve the intensity of jarring and vibratory shocks. The inside or caliber of $a$ is made into any convenient geometrical outline other than a circle.

Extending from the lower plane of F is the projection $b$, forming the connection between the cup and any part of machinery to which the device may be attached. The projection $b$, which may be a screw if desired, is provided with a small caliber, $c$, through which the lubricant flows in its passage from the cup to the journal or bearing-surface to be lubricated.

D is a piston or plunger, having its periphery a male screw, and fitting exactly and perfectly into the female-screw caliber of the cylinder A. The top plane of the piston is hollowed or chambered out, to furnish a receptacle for holding oil or lubricant whenever the same shall be filled into the cup through the top. Running athwart this chamber is a cross-piece, E. This cross-piece is pierced through by the hole $h$.

$k$ $k$ are small ports leading from the chamber to the hole $h$, and are thus located for the purpose of feeding the oil into the space below the piston, in a manner to be hereinafter set forth.

On the top of the cylinder A is a collar, $f$. To this collar is screwed a stuffing-nut, B.

Extending from the piston D upward through the collar $f$ is seen a hollow stem or key, G, which is provided at its top end with a crossbar or handle, $d$. Cut into the lower end of G are slots $e\ e$. When the key is attached to the cup these slots fit tightly down over the crosspiece E, thus affording a convenient method for turning the piston or plunger when it is deemed necessary to change its position. The key or stem G is adjustable and removable. It may be made a permanent part of the cup, or it may be taken out and used as key to turn the pistons of any number of cups correspondingly constructed. When used as a fixture, in order that there shall be no danger of its being thrown out of place and lost by any violent shaking or vibratory motion of the machinery, a screw-bolt, C, is passed through it and screwed into the hole $h$ in the piston. The security from the danger of displacement and loss afforded by the screw-bolt C may be reenforced by turning up the stuffing-nut B. When G is used as a key it is readily detached from the cup by removing the screw-bolt C. The stuffing-nut may then be turned into a cap by providing it with a blank washer to stop the key-hole. Thus the ingress of any objectionable substances will be prevented. A great advantage accomplished by removing the stem or key G is the reduction of the size and weight of the cup, and thus the danger that top-heaviness will operate to make it work loose when shaken and jarred by moving machinery will be overcome.

The manner in which the base-block F is fastened to any part of machinery—that in which the cylinder and base-block are joined together and the screw-piston D perfectly working in the screw-caliber of the cylinder A—presents a more stable arrangement of parts under all circumstances, and more especially when shaken and vibrated, than that provided by any oil or lubricating cup having self-contained mechanism for feeding now in common use. At the same time the combination of the two screws gives the greatest capacity of mechanical power for forcing the lubricant contained in the space under the piston down through the caliber $c$ and feeding it in very large or very minute quantities, as may be desired.

Having thus explicitly described the construction of my invention, I will explain its application and operation.

The base-block F, through the medium of $b$, is first rigidly attached or screwed to a machine in any desired position over a journal or other bearing-surface. If a hard lubricating substance is to be used, it is filled into the cylinder A below the piston D, the piston having been elevated as far as possible. The cylinder is then screwed to the base-block. By turning the key and sending the piston downward the operator is enabled to force the lubricant through $c$ to the part to be lubricated.

When a light lubricating-oil is to be used the space under the piston is filled with any capillary material—for example, such as hair, wool, combings, sponge, &c. After this the cylinder A and base-block F are screwed together as before. The screw-bolt C is then removed and the oil is poured into the hollow stem G, from which, by means of the hole $h$, it passes into the space beneath the piston and percolates through and thoroughly saturates the capillary substances. The bolt C is then replaced and the cup is ready for operation.

A reserve supply of oil may be placed in the chambered top of the piston, so that when more oil is wanted it is only necessary for the operator to slightly loosen the screw-bolt until the lower end is raised above the point where the ports $k\ k$ enter the hole $h$. The oil will then flow from the chamber to the space beneath the piston. The screw-bolt is then screwed into place.

By the above-described methods of construction and operation I am enabled to manufacture and place upon the market a new and improved cup for holding lubricating substances which will be found to be highly practical for use wherever a grease-cup is desirable. Especially is this the case when the cup will be subjected to the constant jar and vibration of machinery. It is sure and effective in its operation when, from climatic or other influences, the contained lubricant becomes congealed or coagulated. Further, it is simple of construction, compact in form, not liable to be deranged in its movable and adjustable parts, and easily repaired when broken.

What I claim as my invention, and desire to secure by Letters Patent, is—

1. In an oil-cup, the combination of the cylinder A, having an internal screw-thread, and plunger D, screw-threaded on its periphery, with stem G, slotted at $e$, substantially as shown and described.

2. In an oil-cup, the combination of the cylinder A, having an internal screw-thread, and plunger D, screw-threaded on its periphery, with stem G, slotted at $e$, and screw-bolt C, substantially as shown and described.

3. The combination of the cylinder A, stem G, and screw-bolt C with the plunger D, provided with the hole $h$ and ports $k\ k$, substantially as and for the purposes set forth.

4. In an oil-cup, the cylinder A and plunger D, as described, in combination with stem G, screw-bolt C, and base-block F, having downward projection $b$ and screw-threaded upward projection $a$ and opening $c$, substantially as shown and described.

In testimony that I claim the foregoing as my own I have affixed my signature in the presence of two witnesses.

JOSEPH L. WINSLOW.

Witnesses:
JOHN B. LITTLEFIELD,
HERBERT G. BRIGGS.